Dec. 12, 1939. W. J. HUGHES 2,183,075
LIQUID CONTROL
Filed Nov. 29, 1935 8 Sheets-Sheet 1
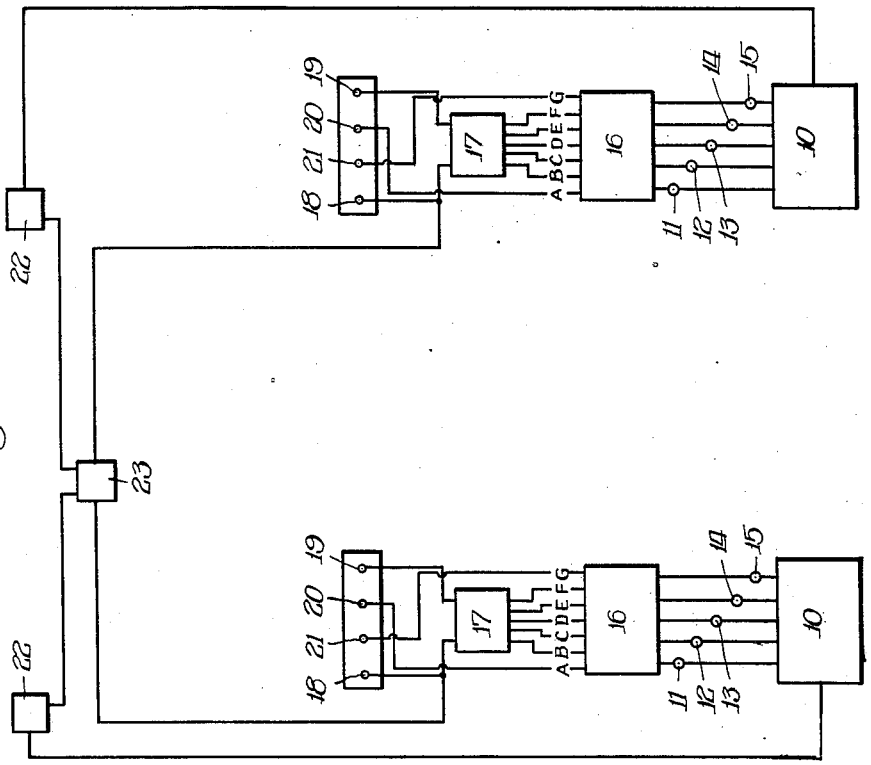
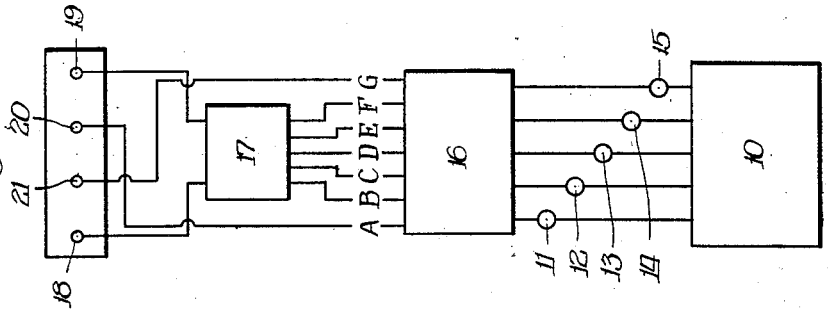
Inventor:
Walter J. Hughes,
By Cromwell, Greist & Warden
Attys.

Dec. 12, 1939.  W. J. HUGHES  2,183,075
LIQUID CONTROL
Filed Nov. 29, 1935  8 Sheets-Sheet 2
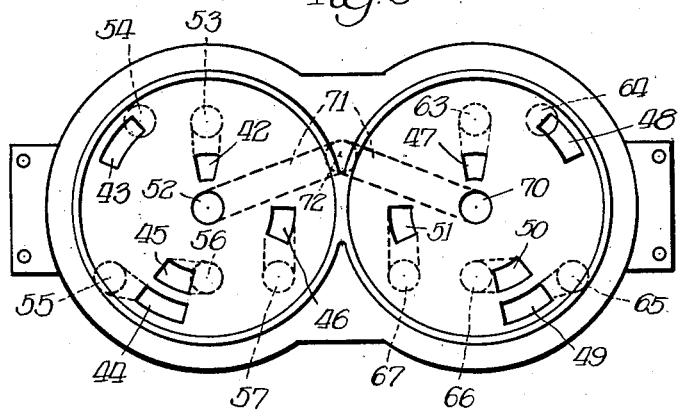
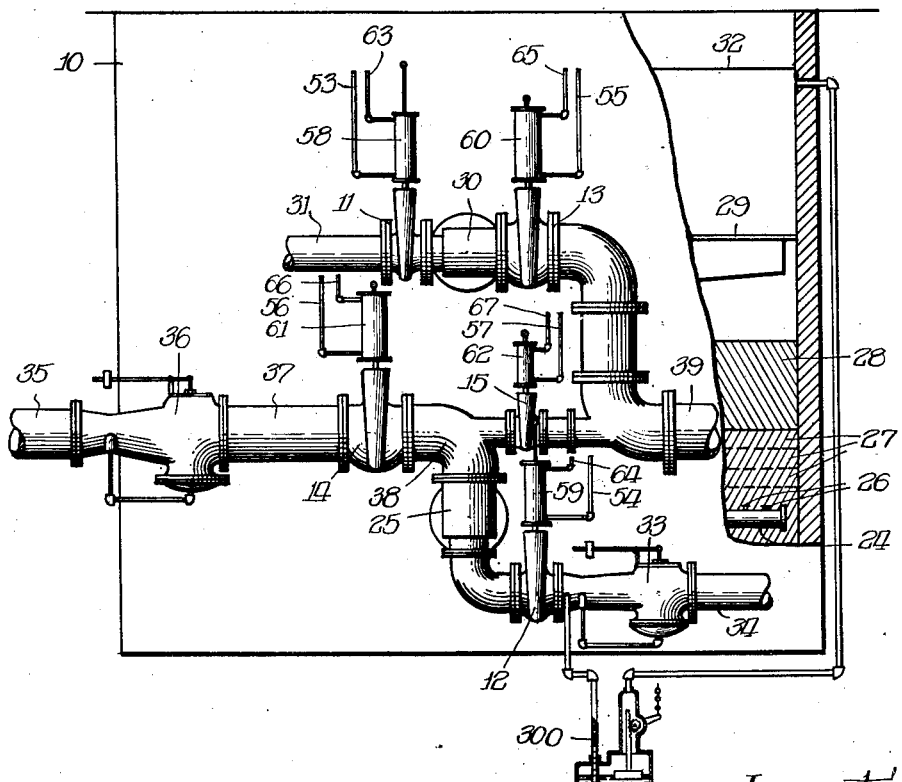
Inventor:
Walter J. Hughes,
By Cromwell, Greist, Warden
Attys.

Dec. 12, 1939. W. J. HUGHES 2,183,075
LIQUID CONTROL
Filed Nov. 29, 1935 8 Sheets-Sheet 3
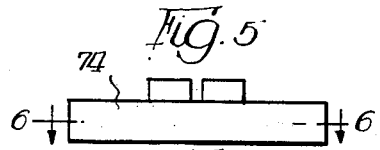
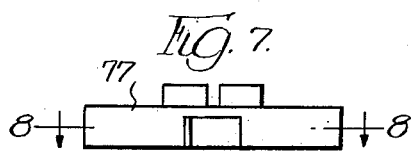
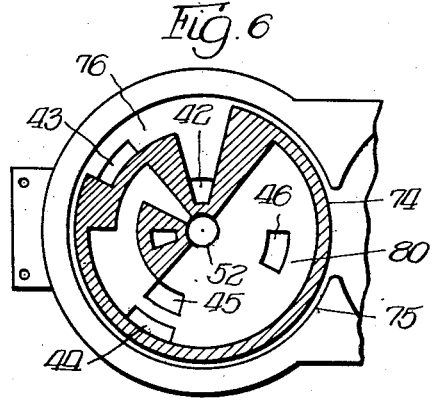
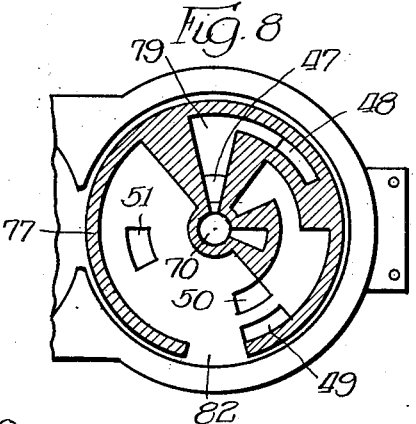
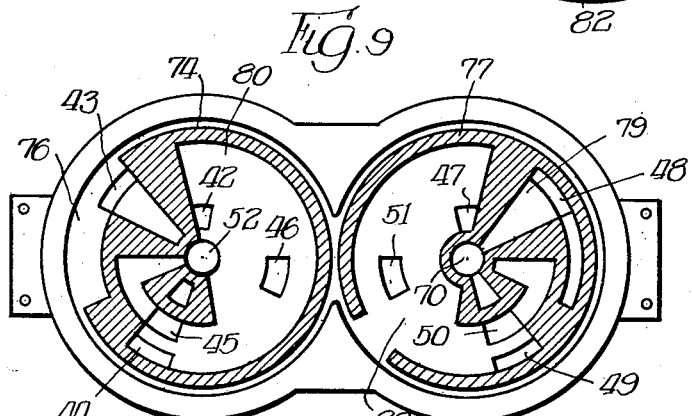
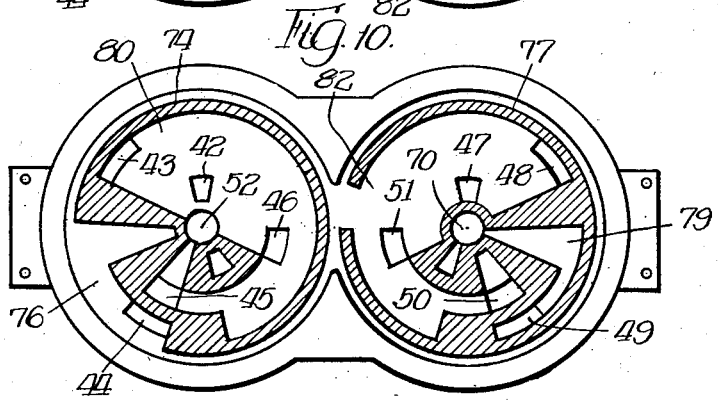
Inventor:
Walter J. Hughes,
By Cromwell, Greist - Warden

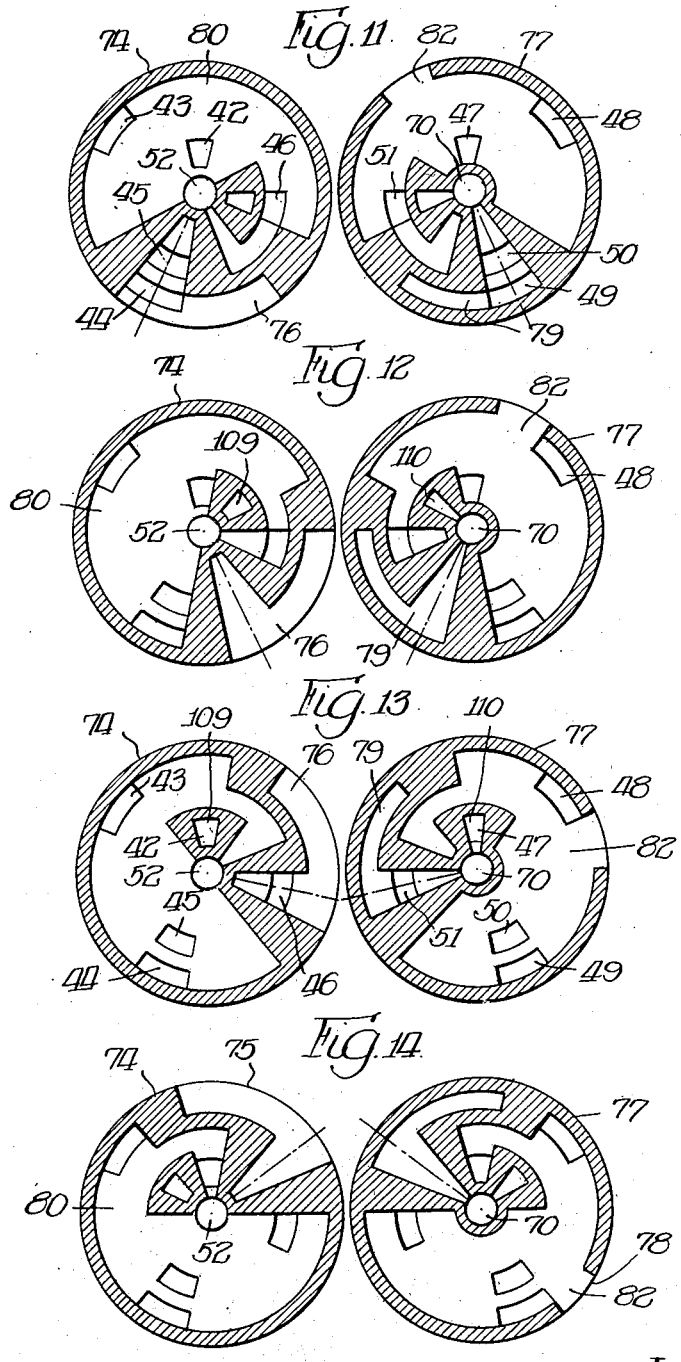

Dec. 12, 1939.  W. J. HUGHES  2,183,075
LIQUID CONTROL
Filed Nov. 29, 1935  8 Sheets-Sheet 5
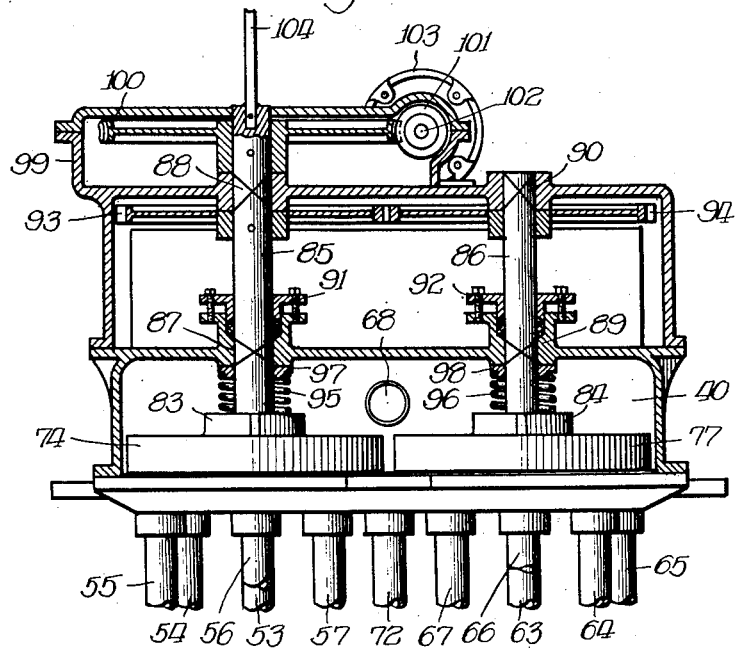
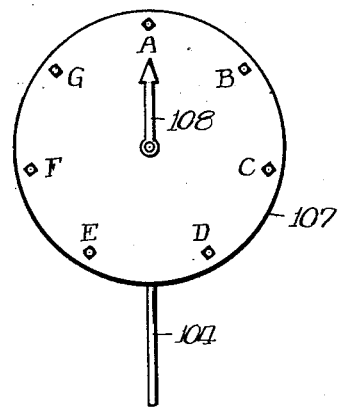 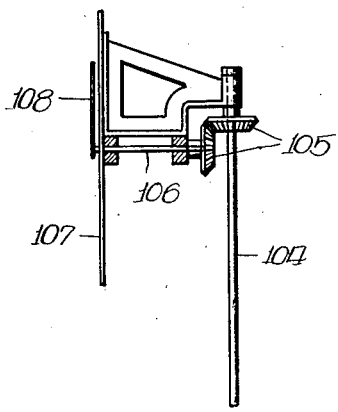
Inventor:
Walter J. Hughes,
By Cromwell, Greist & Warden
attys Dec. 12, 1939.  W. J. HUGHES  2,183,075
LIQUID CONTROL
Filed Nov. 29, 1935  8 Sheets-Sheet 7
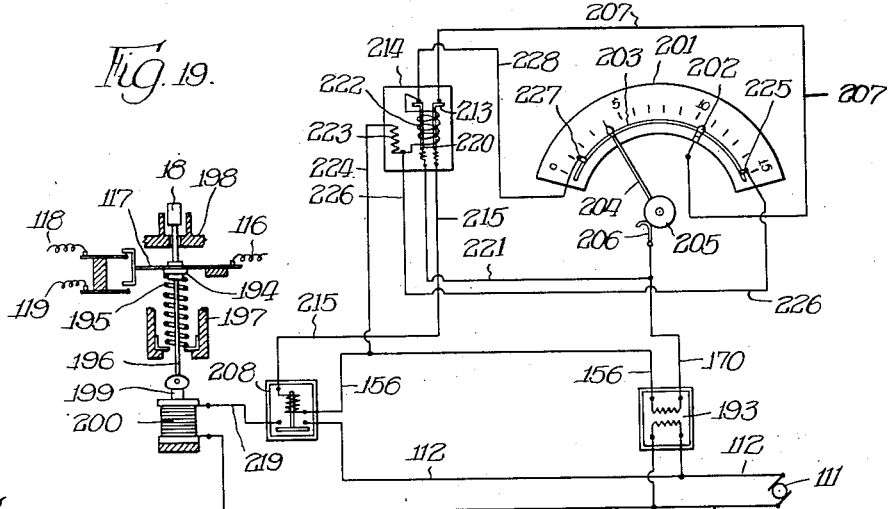
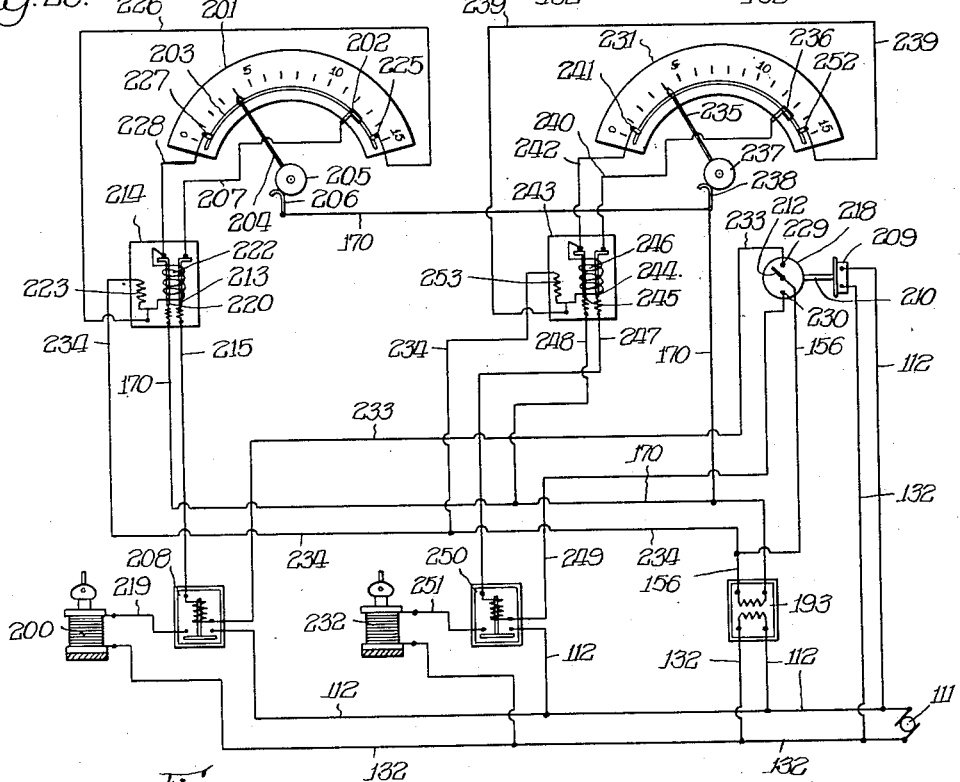
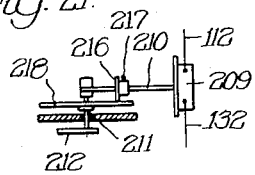
Inventor:
Walter J. Hughes,
By Cromwell, Greist & Warden
attys

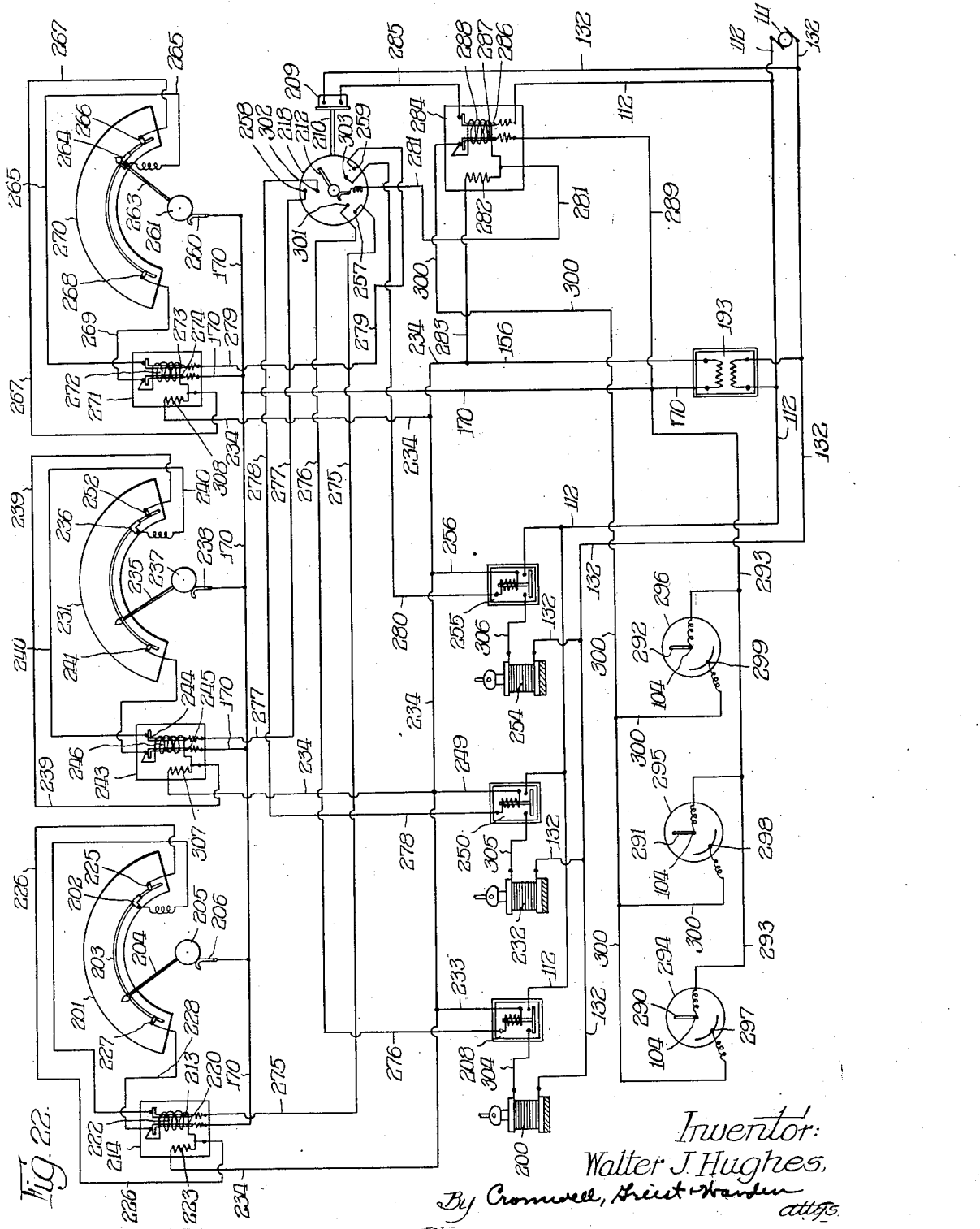

Patented Dec. 12, 1939

2,183,075

UNITED STATES PATENT OFFICE 2,183,075

LIQUID CONTROL

Walter J. Hughes, Chicago, Ill., assignor, by mesne assignments, to Infilco Inc., a corporation of Delaware Application November 29, 1935, Serial No. 52,054

16 Claims. (Cl. 210—130)

The present invention relates to water filtration plants and other similar plants and their operation, and has particular reference to an improved method of operating and to control mechanism for such plants involving a unified system for carrying out the cycle of operations necessary in the normal operation of a gravity type of water filtration plant.

The ordinary filtration plant such as may be employed in city water supply systems generally includes a number of gravity operated filtration units having beds of relatively large size. The complete filtration process requires in each filter unit a cycle of steps. Each of the several units of such a filter plant is ordinarily complete in itself but there generally is some common service feature which is inadequate to serve all simultaneously, and perhaps not more than one unit at a time.

Up to the present time all such plants have been hand operated and controlled. Some automatic devices are used, as for instance a flow controller on the discharge line from each unit to control the rate of filtration thereof to a set amount. Also gauges or indicators are provided to show various conditions as they exist in the several units. With such helps the operation of the plant is controlled by attendants, who manually open and shut or control the opening and closing of the various valves by which the plant or the several units may be served. This involves constant supervision so that care be given as required, and as most such plants are operated twenty-four hours per day, three shifts of attendants are required although there may be lengthy periods when there is no work to be done. A principal object of my invention is therefore to provide a method of operation and apparatus therefor that make this constant and close supervision and attention unnecessary by providing for the automatic control and operation of the individual units and of the plant as a whole. A further object is to provide for the coordination of the operation of the individual units comprised in such a plant so that there will not be interference.

Another object is to provide for the operation of a single unit on a time control basis and also where a plurality of units are associated to correlate their operation on a time basis.

Another object is to provide for a control of the operation of a unit from or by some condition in the unit or its operation and to then also appropriately correlate the operation of the members of a group of units.

A principal object of my invention is to provide a method and apparatus for operation of gravity type filter units singly and in grouped relation based upon a predetermined cycle of operation.

An additional object is to provide an automatic apparatus for operating the members of a group of filter units through a series of operating steps in such a manner that the steps of the various filters are coordinated, while at the same time any of the steps may be prolonged without disturbing the subsequent normal operation.

A further object is the provision of a filter control mechanism of the type referred to in which the operation of a filter unit is automatically carried out through a program of steps occurring at timed intervals over a fixed period, an automatic timing device being provided therefor and there being additionally, means for suspending operation of the timing device when circumstances or convenience requires.

A special object of the invention is the provision of a central timing device for the operation of such filters in which there is provided means for starting the device and for stopping it at the end of a fixed period of time, the device being operable after the start of the period to make an initiating circuit that will terminate an untimed first function and start a second function, simultaneously breaking the initiating circuit; after an adjustable period of time to make a second initiating circuit that will terminate the second function and start a third function, simultaneously breaking the second initiating circuit; and to repeat this process through a series of five separately timed functions. At the end of the time for the last function the device makes a fifth initiating circuit which will terminate the fifth function and restore the untimed first function, at the same time preparing the circuit for again starting the device, all the above being completed within the period provided.

Another special object is the provision of a filtration control system which has adjustable timing devices automatically controlling the time intervals of operating each of the filters of the system through the steps of drainage, washing, rewashing and return to filtering.

Another object is to provide an automatic filter control system in which a timed cleansing program is initiated by and carried out upon a predetermined loss of head in the filter unit.

A still further object of the invention is to provide a filter system control in which a central selector controls the sequence of action of a plurality of timing members which in turn control multi-positioned valves operatively connected each to the valves of a unit of a gravity filtration system that comprises a plurality of units.

A further object is the provision of an improved hydraulic control valve for operating filters and the like.

Another object of the invention is the provision of automatic group control of a filtration system combined with automatic operation control of the units thereof.

These and other objects will be evident from a consideration of the following specification in which there is described for purposes of illustration and explanation a preferred embodiment of the invention, and by reference to the accompanying drawings, in which Fig. 1 is a diagrammatic chart of a filter control constructed in accordance with my invention;

Fig. 2 is a similar chart showing two of the units of Fig. 1 in a system also having loss of head initiating devices and a central selector;

Fig. 3 is a diagrammatic sectional view of a main control valve constructed in accordance with my invention;

Fig. 4 is an end view partially in section, of a conventional gravity filter with front piping and valves;

Fig. 5 shows in elevation the left valve disk of the valve shown in Fig. 15;

Fig. 6 is a sectional view taken along line 6—6 of Fig. 5 and showing the disk of Fig. 5 superimposed upon the left side set of ports of Fig. 3 as in A functional position;

Fig. 7 is a view of the right valve disk of the valve shown in Fig. 15;

Fig. 8 is a sectional view taken along line 8—8 of Fig. 7 with the disk shown superimposed upon the right side set of ports of Fig. 3 as in A functional position;

Fig. 9 is a sectional view of the valve shown in Fig. 15 as in B functional position, the discs being shown in section.

Fig. 10 is a view similar to Fig. 9 showing the valve in C functional position;

Fig. 11 is a view similar to Fig. 10 but simplified, showing the valve discs in D functional position;

Fig. 12 is a view similar to Fig. 11 showing the valve discs in E functional position;

Fig. 13 is a view similar to Fig. 11 and shows the valve discs in F functional position;

Fig. 14 is a view similar to Fig. 11 showing the valve discs in G functional position;

Fig. 15 is a front view, partially in section of the main control valve of Fig. 3 with a driving mechanism and pipes leading to the valve cylinders;

Fig. 16 shows the dial of the function indicator;

Fig. 17 is a side view partially in section of the function indicator dial of Fig. 16 and shows drive mechanism therefor;

Fig. 19 shows mechanism and wiring diagram for initiating the washing program of a filter unit upon a predetermined loss of head therein;

Fig. 20 illustrates the mechanism and wiring of Fig. 19 extended to cover two filters, with means for preventing more than one of the filters from being washed at a time;

Fig. 21 is a detail view of a portion of Fig. 20; and

Fig. 22 is a view similar to that of Fig. 20 but of a modified form as preferred to take care of a larger number of filter units.

Figure 18:
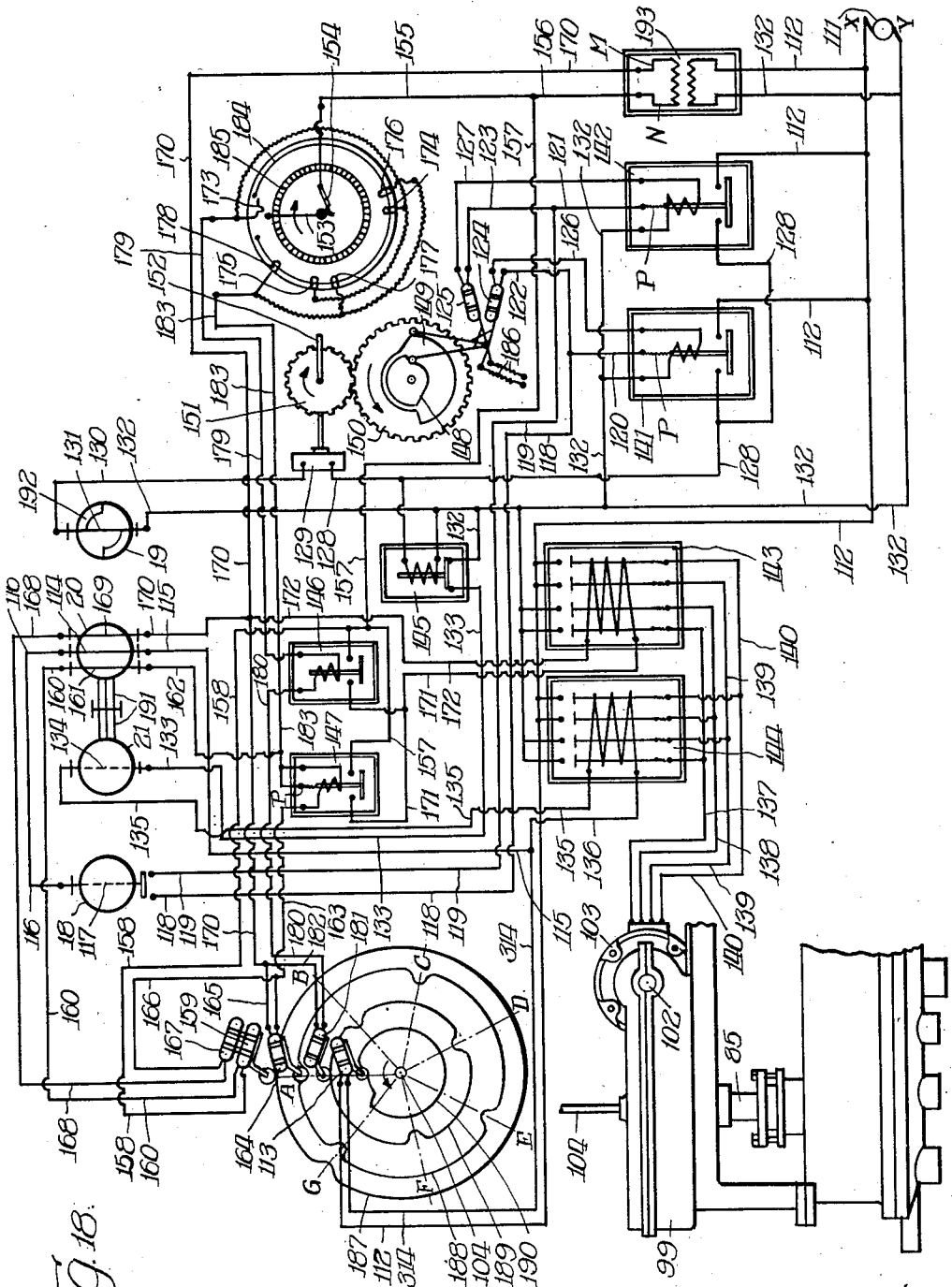
Fig. 18 is a wiring diagram of electrical control circuits employed in accordance with the invention.

In the operation of a gravity filter a cycle comprising two general steps is involved. The first is that of filtration of the water while the second, which is that of cleansing the bed, involves a series of operations. This series of operations includes cutting off the supply to the filter to drain down the water above the bed, the latter being commonly done by filtering off this water to conserve it. The next operation is that of actually washing the filter with an upward or reverse flow of wash water. The last operation is that of putting the filter bed in proper condition for filtering service which is done by filtering to waste for a short time.

The first or filtering step is relatively long, often being of from 20 to 30 hours duration, this time being dependent upon such factors as rate of filtration and amount of sediment in the water being filtered since these factors determine the rapidity of clogging of the filter bed by accumulation of sediment. As the clogging increases it is evidenced by greater resistance to flow through the bed, a condition commonly spoken of in practice as loss of head.

Since in gravity filter operation only so much water head is available to cause flow, it is obvious that as filtration continues clogging will eventually cause the rate of filtration to slow down to an extent that further operation is not economical or else not desirable for other reasons. This end point is usually determined when a desired fixed rate of filtration can no longer be maintained, that is, when the head available is so consumed by clogging that filtration is retarded. Thus the loss of head usually is the measure by which the end point of the filtration step is determined. When this loss amounts to about ten feet, good practice dictates that the filter bed be washed.

In order to carry out the second or cleansing step of the cycle, the several operations described above are executed in set order, and for ordinary conditions they involve fairly well fixed time periods. Thus they may be carried out in an orderly program as to sequence and time, means of course, being provided for changing the timing of the periods to suit changes in conditions.

The carrying out of the series of operations included in the cleansing of the bed and its return to service involves a number of consecutive actions. The first, or B action, when the second step of the cycle is put in force, is cutting off the supply to the filter by closing the influent valve. The second, or C action, after allowing the filter to drain through its effluent for a given time, is to close the effluent valve and open the waste valve.

The third, or D action, after allowing time for effluent valve to close and waste valve to open, is to open the wash valve.

The fourth, or E action, after allowing time for effective washing, is to close both wash and waste valves.

The fifth, or F action, after allowing time for closing of the wash and waste valves, is to open the influent and rewash valves.

The sixth, or G action, after allowing time for a short rewash, is to close both influent and rewash valves. This provides a shut-off position since all valves are closed.

The seventh, or A action, is to restore the filter to service by opening its influent and effluent valves.

The actions themselves consume time in that large size hydraulically operated valves take time to open and close without slamming and without causing damaging water hammer. And the operations controlled by the valve action and that later take place between the valve actions, also consume time. Thus the second step of the cycle as to timing and sequence of its included actions and operations, may be tabulated as follows, the lettering used being referred to hereinafter: It will be understood, of course, that the times given are for illustrative purposes and may not correspond to the times allowed in practice.

| Control valve functional position | Action | Elapsed time, minutes | Operation |
|---|---|---|---|
| B | Close influent valve (20-minute drain to effluent). | 0 | Start of draining to effluent. |
| C | Close effluent valve and open waste valve. (2 minutes for valves to operate). | 20 | End of draining. |
| D | Open wash valve (10 minutes for washing). | 22 | Start wash. |
| E | Close wash and waste valves. (2 minutes for valves to operate). | 32 | End wash. |
| F | Open influent and rewash valves. (5 minutes for rewashing). | 34 | Start rewash. |
| G | Close influent and rewash valves. | 39 | End rewash. Filter off. |
| A | Open influent and effluent valves. |  | Filter on. |

For this method of operation, five hydraulically operated gate valves are required, the valves being termed, respectively, influent, effluent, waste, wash and rewash. The hydraulic cylinders that operate to open and close these valves are connected in the usual manner to a source of pressure and a waste line. Thus one end of a cylinder may receive pressure water to act on one side of a piston therein while the other end is relieved to waste or vice-versa, in order to move the piston to either open or close the valve to which the piston is attached by a suitable rod.

Control of the admission of pressure water to one end of the cylinders and the escapement from the opposite cylinder ends to effect valve opening or closing motion, is by means of a main control valve. This valve is motor-operated and has seven positions which by port arrangement control respectively the seven actions tabulated above. Positioning of this valve to carry out the several actions in the predetermined time and sequence is controlled by means of a timer so that in my improved apparatus the operation of each filter is automatic. Further, a central timing selector is provided that supplies the starting impulse for each unit timer so that the operation of the several units of a filter system are coordinated as well as automatic.

In order that a general understanding of the relation of the main parts of my apparatus may be had before going into details of the construction and operation of these parts or referring to the numerous connections and cooperating parts, reference is made to the purely diagrammatic charts of Figs. 1 and 2. Thus in Fig. 1 a single filter indicated by 10 is shown subject to the several operating valves 11—15, which are all under control of a control valve 16. Control 16 is in turn subject to the timer 17 and also to push-buttons 20 and 21, and timer 17 is under push-buttons 18 and 19. Stated briefly, closing push-button 18 will start timer 17 which will normally control valve 16 through a series of positions to operate valves 11—15 to take filter 10 off from filtering, put it through the several steps of the cleansing process and restore it to filtering. Since it may be desired now and then to prolong one of the steps beyond its normal period this is provided for by the button 19, which will stop timer 17 in any position so long as depressed. Also since it is desirable to be able to cut a filter out of service and later restore it at irregular times, push-bottons 20 and 21 are provided which control operation of valve 16 without going through timer 17. If button 20 be depressed valve 16 will shift to "off" position, controlling valves 11—15 to cut the filter out and it will remain out until button 21 be depressed which will cause 16 to shift back to "on" position, operating valves 11—15 as necessary to put 10 back in service.

Fig. 2 shows the same parts in the same relation as in Fig. 1 but in duplicate to indicate a plant having two units. There are also shown two additional members 22, one for each unit. These members 22 indicate means for initiating operation of timer 17 automatically from conditions in or about the filter unit, as from a loss of head gauge, and are accordingly shown in parallel with buttons 18. Since this opens the possibility of both timers 17 being started so as to be in operation at the same time, which is undesirable, the members 22 are shown connected through another new member 23, which serves to prevent both circuits that include the member 22 being closed at the same time and also, after one such circuit has been closed, to hold the other open for a predetermined period or until the other timer 17 has completed its cycle.

The manner in which these general control operations are carried out will be better understood by reference to the following more detailed description of the filter system.

As shown in Fig. 4 the numeral 10 indicates a gravity filter basin of common type, the front wall of which is partially cut away to show the end of one of the underdrain pipes 24 which are connected to a central header that runs horizontally across the bottom of the filter and passing through the front wall of the filter to terminate at a T 25 in the usual manner. The underdrain pipes are provided with strainers 26, and the entire underdrain system of pipes is covered by layers of graded supporting gravel 27. Above the uppermost of the layers 27 of gravel there rests a bed of filter sand 28. A system of wash water collecting troughs 29 connects through the front wall of the filter to the T 30.

The water to be filtered enters through influent pipe 31 from a suitable coagulating basin or other source of supply through influent valve 11 to the T 30. From this T the water passes into the filter basin in which the level is maintained at the level 32 by any suitable means.

During filtration the water passes downwardly through the filter bed 28 and supporting material 27 and is collected by the underdrain system of piping 24. From this underdrain system the water flows to the central header connected to the T 25 and thence through valve 12, the effluent rate of flow controller 33 and the effluent pipe 34 to storage or use.

During the filtering operation (function A) the influent valve 11 and the effluent valve 12 are open, and the waste valve 13, the wash valve 14 and the rewash valve 15 remain closed.

When it becomes necessary to wash the filter bed, the influent valve 11 is closed to cut off the supply of coagulated water. For a period of perhaps twenty minutes or less the filter is permitted to drain through the effluent to conserve the coagulated water that is in the upper part of the filter basin (function B). When the level 32 is dropped to about the top of the wash troughs 29 the effluent valve 12 is closed and the waste valve 13 is opened to drop the level 32 to the top or lip of the wash troughs 29 (function C).

Thereafter, the filter is ready for the actual washing operation which is started by opening the wash valve 14. The wash water is delivered to the filter by the pipe 35 through a wash water rate controller 36, the pipe 37, wash valve 14, T 38 and the T 25. From the latter, the water enters the underdrain or distributor system of the filter and from thence passes upwardly through the bed carrying off the accumulated sediment. The wash water overflows into the wash troughs 29, from which it passes out through the T 30, the waste valve 13 and the waste or sewer line connection 39. The pipe 35 may be a branch from a wash water header serving a plurality of filters and the controller 36 may then well be in the header instead of having a separate controller in each branch.

After a period of say 10 minutes the washing is terminated by closing both the wash valve 14 and the waste valve 13 (function E), time being allowed for these two valves to completely close.

The next operation comprises opening the influent valve 11 to refill the filter basin to the level 32 with coagulated water, and opening rewash valve 15 to permit filtering to waste through 39 in order to put the filter bed in condition before resuming filtering to service.

In the next operation the influent valve 11 and the rewash valve 15 are closed to terminate the rewash and bring all valves of the filter to their closed position. In such position the filter is "off". The filter may merely pass through this position and be restored to service immediately by opening the influent valve 11 and the effluent valve 12, or this restoration to service may be delayed.

It will be understood that the particular times given in connection with the description of the several functions are for illustration only. The actual times will vary in different plants, depending upon factors including details of construction and the character of the water. In some instances it will be found desirable to change the timing of one or more of the functions at different seasons, or for other reasons. In accordance with my invention I provide means for a wide range of time adjustment for each of the functions without loss of time through blank spaces, the total time from "off" to "on" position being simply the sum of the times allotted to the several functions regardless of what these may be. The filtering step is by far the longest step in the cycle of operations and usually will be indeterminate as to time, the actual time being that required for the filter to become clogged.

In Figs. 3, 6, and 8 to 14, the improved valve mechanism is disclosed in various operating positions. This valve has two complementary discs with corresponding seats and ports. The leads to the corresponding ports of the two seats are connected to opposite sides of the hydraulic pistons by which the valves of the filter unit are opened and closed. The left unit is provided with ports 42, 43, 44, 45 and 46, positioned as shown in Fig. 3 and the right unit contains corresponding ports 47, 48, 49, 50 and 51. Ports 42, 43, 44, 45 and 46 lead through pipes 53, 54, 55, 56 and 57 respectively, to the lower ends of the hydraulic gate valve cylinders 58, 59, 60, 61 and 62, respectively. Cylinder 58 controls influent valve 11, cylinder 59 controls effluent valve 12, cylinder 60 controls the waste valve 13, cylinder 61 controls wash valve 14 and cylinder 62 controls the rewash valve 15. In the right side of the valve, port 47 leads through pipe 63 to the upper or closing end of the hydraulic gate valve cylinder 58. Port 48 connects through pipe 64 to the closing end of cylinder 59. Port 49 connects through line 65 to cylinder 60. Port 50 connects through line 66 to the closing end of the cylinder 61. Port 51 connects through line 67 to the closing end of cylinder 62.

Water under pressure is introduced at 68 into the chamber 40 in the cover above the valve discs while from under the discs water may escape through ports 52 and 70 and channels 71 to pipe 72 (Figs. 3 and 15). It will be understood that the operation of the double valve is such that to operate any one of the gate valves water under pressure is directed to one end of its hydraulic cylinder through the proper port on one disk while the other end of the cylinder is opened to waste through the corresponding port on the other disk.

The position into which the control valve discs are placed to start filtration and in which they remain during the filtration period (function A), is shown in Figs. 6 and 8. Referring to these figures, and also to Figs. 3, 4 and 15 it will be seen that pressure water from chamber 40 enters through recess 76, port 42 and pipe 53 to the bottom of cylinder 58 to open influent valve 11 and hold it open, water from the upper end of 58 escaping through pipe 63, port 47, recess 79, port 70 and channel 71 to vent 72. At the same time effluent valve 12 is opened and held open by water from chamber 40 entering through recess 76, port 43 and pipe 54 to the bottom of cylinder 59, escape of water from the top of 59 being through pipe 64, port 48, recess 79, port 70 and channel 71 to vent 72. During this period valves 13, 14 and 15 are left closed by pressure transmitted to the tops of their cylinders from chamber 40 through recess 82 and ports 49, 50 and 51 in the right-hand side, the bottoms of these cylinders being open to waste through ports 44, 45 and 46, recess 80, port 52 and channel 71 to vent 72.

In Fig. 9 the discs are shown in the positions into which they are rotated to drain down the water above the filter bed (function B). At this time pressure water from 40 still reaches the bottom of cylinder 59 through recess 76, port 43 and pipe 54, the top thereof being relieved through pipe 64, port 48, recess 79, port 70 and channel 71, to vent 72, to hold effluent valve 12 open. Influent valve 11 shifts to closed position because pressure water now has access to the top of cylinder 58 from chamber 40 through recess 82, port 47 and pipe 63, the bottom of the cylinder now being relieved through pipe 53, port 42, recess 80, port 52 and channel 71 to vent 72. The other valves remain in closed position since the pressure and waste connections to their cylinders are not altered.

It will be seen in Fig. 15 that the two valve discs 74 and 77 are provided with hubs indicated at 83 and 84, by which the discs are loosely keyed to their respective centering and turning shafts 85 and 86. Shaft 85 is journaled at 87 and 88, while shaft 86 is journaled at 89 and 90.

A gland 91 is provided on shaft 85 and a corresponding gland 92 is provided on shaft 86. To shaft 85 is keyed a spur gear 93 which meshes with a similar gear 94, keyed on shaft 86, thereby insuring synchronous rotation of the valve discs. Spring 95 maintains the disk 74 properly seated, and spring 96 acts likewise upon disc 77, the upper ends of the springs pressing against collars 97 and 98, respectively.

Shaft 85 extends above its upper journal 88 into the worm gear housing 99, where it is pinned to the worm wheel 100, the latter being driven by the worm 101 on the extended motor shaft 102 of motor 103. This manner of driving the two valve disks causes them to rotate in unison but in opposite directions.

In Figs. 15, 16 and 17 the shaft 104 is shown extending from the shaft 85 and through the bevel gears 105 turning shaft 106 to which is attached pointer 108. Pointer 108 moves over the face of dial 107 and by its position thereon indicates the position of the control valve and so the function in which the filter rests or to which it is shifting.

Fig. 10 shows the position into which the two discs 74 and 77 are turned to open waste valve 13 and close effluent valve 12 (function C). Pressure recess 76 of valve disk 74 now uncovers port 44 while waste recess 80 of valve 74 connects ports 42, 43, 45 and 46 to waste port 52. Recess 79 of valve disk 77 connects port 49 to waste port 70 while the pressure port 82 of valve disk 77 conveys pressure to ports 47, 48, 50 and 51. From Figs. 3, 4 and 15 it will be seen that with the ports so arranged all valves of the filter are closed except the waste valve 13, which is opened. When effluent valve 12 is closed valve 14 may be opened to admit wash water and Fig. 11 shows the position of the two valve discs 74 and 77 with respect to the valve seat ports when turned to the next position for this purpose (function D). Pressure recess 76 of valve disk 74 now uncovers ports 44 and 45 to pressure, and waste recess 80 connects ports 42, 43 and 46 to waste port 52. Waste recess 79 of valve disk 77 connects ports 49 and 50 to waste port 70 and recess 82 of valve 77 transmits pressure to ports 47, 48 and 51. Thus as may be seen from Figs. 3, 4 and 15, all valves of the filter are closed except wash valve 14 and waste valve 13 which are open during function D to wash the filter.

When washing is completed a further turning of the discs brings them to the position of Fig. 12 where the two valve discs 74 and 77 are shown with respect to the valve seat ports when turned to position to close wash valve 14 and waste valve 13 (function E). Pressure recess 76 of valve disk 74 is now turned to blank, while waste recess 80 of valve disk 74 connects all ports to waste port 52, and valve disk 77 brings all seat ports to pressure through side opening 82 so that all valves of the filter are closed.

After allowing the time necessary for closing of these valves the control valve is again turned as indicated in Fig. 13 which shows the position of the two discs with respect to the seat ports during the rewash period (function F). Pressure recess 76 and pressure port 109 of valve disk 74 now convey pressure to ports 42 and 46 while waste recess of valve disk 74 connects ports 43, 44 and 45 to waste port 52. Waste recesses 73 and 110 of valve disk 77 connect ports 47 and 51 to waste port 70 while pressure recess 82 of valve disk 77 conveys pressure to ports 48, 49 and 50. As is seen from Figs. 3, 4, 13 and 15, all valves of the filter are now closed except influent valve 11 and rewash valve 15 but pressure water is admitted to the bottom of the hydraulic cylinders on these two valves, the tops being relieved to waste.

Fig. 14 shows the position of the two valve discs with respect to the valve seat ports when turned to the position of function G. This position is an "off" position adjacent the filter "on" position of function A. During function G all ports of seat 75 are connected to waste through recess 80 of disk valve 74 while all ports of seat 78 are connected to pressure through side opening 82 of valve disk 77. Thus, as seen from Figs. 3, 4 and 15, all valves are closed, as they should be in this "off" position.

It will thus be seen that the operation of a filter unit is controlled dependent upon the position of the valve discs 74 and 77. Each unit of a system is operated by its own main control valve and, as will be described hereinafter, each main control valve is governed by a time control system whereby the filter may be carried through a cycle of operations as desired.

In Fig. 18 is illustrated diagrammatically the electric circuits, relays, timer, function position stop switches, main valve motor and push-button station for a control system for carrying out or effecting the proper program of functions in accordance with my invention. Provision is made for operation of a filter as follows: To take it from filtering function A, carry it through the functions B, C, D, E, F, G and return to A; to start from A carry through automatically the functions B, C, D, E, F and stop at "off" position G; to later shift from "off" position G to filtering position A; to shift from filtering function A to "off" position G; for individually adjusting the length of the periods allowed for functions B, C, D, E and F; and for prolonging at will the period of any of functions B, C, D, E or F during any cycle without changing the setting controlling the regular period thereof.

Fig. 18 will be more readily understood by considering it as separated into two groups of circuits, namely, the timer circuits and the main valve motor control circuits. The purpose of the timer circuits is to secure one revolution of the timer shaft 152 in a given time, in this case taken as 45 minutes, to move the contactor 153 which is mounted on shaft 152, across the several contacts, and to stop the timer at the completion of the revolution. Tracing from X, the terminal of source of energy 111, the lead 112 carries the circuit through the mercury switch 113, shown "closed" as in the function A position of the cam 190, through lines 314 and 115 of the normally closed push-button switch 20, and line 116 to one terminal of the normally open push-button switch 18. To initiate the next ensuing program, the button 18 is momentarily depressed to this time carry the circuit from line 116 through leg 117 of switch 18, to line 118. The next program is initiated in the same manner except that the circuit is completed from line 116 through 117 to line 119, and so on alternately, as will be further explained.

This circuit leads through line 118 to line 122, through the "closed" mercury switch 124, lead 126, magnet coil of relay 141 and line 132 to terminal Y of energy source 111, thereby energizing the magnet coil of relay 141 and closing the switch thereof. It will be noted that the corresponding circuit through 119, mercury switch 125 cannot be completed under the described conditions because mercury switch 125 is open.

Again starting at the source, terminal X of 111, the line 112 leads to the now closed switch of relay 141, pigtail p, line 120, line 122, switch 124, line 126, the magnet coil of relay 141 and line 132 to terminal Y of source 111. Thus depressing the button 18 momentarily closes the switch of relay 141 and holds it closed. Again tracing the circuit from terminal X of source 111, it will be seen that line 112 connects, through the switch of relay 141, with line 128 leading to the synchronous motor 129. The other lead 130 from the motor connects with leg 131 of the normally closed push-button 19, the latter being connected by line 132 with terminal Y of the source of energy 111.

The energized motor rotates shaft 152 through one complete revolution of 360° in 45 minutes, and being geared to the cams 148 and 149 by a one-to-two ratio gearing, turns the cams through a half revolution or 180°. The two cams are shaped alike but set 180° apart so that for each half revolution of the cams the rollers of the two mercury switches 124 and 125 will cause reversal of their positions as to being open and closed. As shown, switch 124 is closed and switch 125 is open. Upon making a half revolution, the cam 148 will cause the switch 125 to tip to its closed position, and the cam 149 will drop the switch 124 to its open position, springs 186 and the shaping of the cams providing for snap action. Thus, the holding circuit through the pigtail p of relay 141, the switch 124, the coil of relay 141 and line 132 is broken; the relay 141 breaks the circuit of the motor 129 and the latter, upon making a complete revolution of its shaft 152 stops, the switch 125 having been tipped to its closed position just before the stop.

When the next program is started by again depressing the button 18 this now completes the circuit through line 119, line 123, the now closed switch 125, line 127, the coil of relay 142 and line 132 to source 111. Thereupon, the holding circuit is made from X of source 111, line 112, the switch of relay 142, pigtail p, line 121, line 123, switch 125, line 127, the coil of relay 142, and line 132 to Y of source 111. Likewise, the circuit is completed through line 112, switch of relay 142, line 128, motor 129, line 130, leg 131 of button 19 and line 132 to source 111. The shaft 152 again is rotated through one complete revolution and as a result, the mercoid switch 125 is tipped to break the holding circuit through pigtail p of relay 142 to open the switch of relay 142. The motor 129 then stops and the switch 124 is tipped to its closed position just prior to the stopping of the motor 129, ready for the next program.

Before considering the other circuits, attention is called to relay 145 which is of the normally closed type and whose coil is in the circuit of elements 128 to 132 in parallel with the telechron motor 129. Thus, when either of the circuits above referred to is closed, the switch of relay 145 is open to break a circuit between lines 133 and 132, which circuit will be dealt with hereinafter.

The main control motor 103 is of the reversing type and its control circuits involve the relay 143 which is of the four-pole normally open type, the relay 146 and the pigtail relay 147. Relay 146 and pigtail relay 147 are of the normally open type.

The circuits controlling operation of valve motor 103 include the contact arm 153 of the timer 185 and the contacts 173, 174 and 175, the latter two of which are adjustable in groove 184 in the dial of timer 185. Also included in these circuits are the contacts 176, 177 and 178, all of which are adjustable in the groove 184; pushbuttons 21 and 20; the mercoid switches 181, 164, 159 and 167 held in their respective positions by the main valve cams 187, 188 and 189. Since it is desirable that all of the timer controlled circuits whose contacts are located upon the timer dial 185 should be of low voltage, a transformer 193, connected to the high voltage source 111 through leads 112 and 132, delivers low voltage energy to the lines 156 and 170.

Before tracing these control circuits, it will be pointed out that the two push-buttons 21 and 20 are of the conventional spring toggle type so that when one is closed the other opens. Thus, when button 20 is depressed as shown, it closes circuits 115 to 116, through the element 114; 160 to 162 through 161; and 168 to 170 through 169. The button 21 on the opposite end of the toggle is then up and the one circuit 133 to 135 is broken. Depressing button 21 causes it to make a circuit through elements 133 to 135, and button 20 on the opposite end of the toggle snaps up to break the circuits leading through it. Thus, these two buttons 21 and 20 serve as interlocks insofar as their respective circuits are concerned.

Taking the automatic control of the complete program of functions from A through B, C, D, E, F, G and back to A, the operation is as follows: As hereinbefore referred to, the program cycle is initiated by depressing button 18 which may be designated as the program button. This starts the telechron motor 129 as described, whose shaft 152 makes its revolution in 45 minutes and turns the contact arm 153 thereon slowly in a clockwise direction, and in a few seconds after the start makes contact at 173. Then, beginning at terminal N of the transformer 193, the circuit includes lead 156, line 155 and wipe contact 154 to arm 153, to contact 173, line 179, the coil of relay 146, line 180, closed mercoid switch 181, line 182, line 170 to terminal M of transformer 193. Current passing through this circuit energizes the coil of relay 146 whose switch closes the circuit from N of transformer 193 through 156, line 157, the switch of relay 146, line 171, the coil of relay 143, line 172 and line 170 to M of transformer 193. Thus, relay 143 closes the main valve motor circuit from X of source 111, through lead 112, the switch of relay 143, leads 139 and 140 to motor 103, motor 103, leads 137 and 138, relay switch 143, and line 132 to Y of source 111.

The energized motor 103 rotates through its shaft 102 and the gearing in case 99, thereby driving the valve shaft 85 and thereby the valve discs as previously described, the turn being made from the position of function A to that of function B. Shaft 104 turning in unison with the shaft 85 and having thereon the cams 187, 188, 189 and 190 brings the B function position of these cams under the several rollers of mercoid switches 113, 181, 164, 159 and 167 by counterclockwise rotation, as shown by the arrow on the cam 190. When this new position is reached, the move having been made in about ten seconds, mercoid switch 113 is tilted to open; mercoid switch 181 is also tilted to open because of its roller dropping into the notch of position B in cam 189; mercoid 164 is held tilted to close by cam 188; and mercoids 159 and 167 remain tilted in their open positions by cam 187. Before the contact arm 153 leaves the contact 173, which takes some 20 seconds, the main valve will have been rotated to the B function position. In this position the mercoid 181 will break the circuit through lines 180 and 182 and then through the coil of relay 146 to open the circuit through lines 157 and 171 and the coil of relay 143. This will open the circuit through this relay 143 and thus through leads 112 and 132 and the main valve motor 103 to stop the latter. Since the circuit through elements 153 and 173 at the timer will have been broken at the mercoid 181, no arcing will result when contact 153 runs off from 173 of the timer.

The main valve will now remain in the function B position for some twenty minutes or until the contact arm 153 of the timer has moved around the dial 185 to where contact 176 has been set. When contact arm 153 reaches contact 176, the circuit from N of transformer 193 leads through line 156, line 155, wipe contact 154, arm 153, contact 176, line 183, the coil of relay 147, line 163, mercoid switch 164 (which in the B position of cam 188 is closed), line 165 and line 170 to M of transformer 193. Pigtail relay 147 now closes the circuit from N of transformer 193 through line 156, line 157, line 171, the coil of relay 143, line 172 and line 170 to M of transformer 193. Relay 143 closes circuit from X of source 111 through 112 and leads 139 and 140 to motor 103, and through leads 137, 138 and 132, back to Y of source 111.

Thus energized, the main valve motor 103 rotates the main valve from function B to function C position, and at the C position cam 188 has a notch into which roller of mercoid switch 164 drops to tilt the switch and so to open the circuit through elements 163 to 165. Opening of mercoid switch 164 takes place before contact arm 153 passes from contact 176, as described in connection with contact 173.

The main valve will now remain in the function C position for some two minutes or until the contact arm 153 is moved around the dial 185 to where contact 174 has been set. When arm 153 reaches contact 174, the circuit is completed from N of transformer 193 through line 156, line 155, wipe contact 154, arm 153, contact 174, line 179, the coil of relay 146, line 180, mercoid 181 (which is tilted to its closed position by cam 189 at its C position), line 182 and line 170 back to M of transformer 193. Relay 146 closes circuit through elements 157 to 171, the coil of relay 143, line 172 and line 170. Relay 143 closes the circuit between lines 112 to 132 through the main valve motor as previously described, and motor 103 turns the main valve from function C to function D position, where a stop is made because the roller of mercoid switch 181 drops into the notch at D position of cam 189, tilting mercoid 181 to break the circuit between lines 180 and 182, and thus opens the switches of relays 146 and 143.

The main valve now will remain in the D function position for some ten minutes or until the contact arm 15 of the timer is moved around dial 185 to where contact 177 has been set. When arm 153 reaches contact 177 the circuit is completed from N of transformer 193 through line 156, wipe contact 155, line 154, arm 153, contact 177, line 183, the coil of relay 147, line 163, mercoid 164 (now closed by its roller on cam 188 at the D position under same), line 165 and line 170 back to M of transformer 193. Relay 147 closes the circuit through elements 157 and 171 through the coil of relay 143 and lines 172 and 170 to transformer 193. Relay 143 again closes the circuit through lines 112 and 132 and motor 103 which turns the main valve from function D to function E position. The motor stops by break of the circuit through lines 163 and 165 at mercoid 164, because of the latter being tilted to open position as its roller drops into notch in cam 188 at the E position. Thus a stop in the E function position is in the same manner as previously described.

The main valve will now remain in the function E position for some two minutes or until the contact arm 153 moves around the timer dial 185 to where contact 175 has been set. Upon making contact of 153 to 175, this completes the circuit from N of transformer 193 through line 156, line 155, wipe contact 154, arm 153, contact 175, line 179, the coil of relay 146, line 180, mercoid switch 181 (now held closed by cam 189 whose E position is under its roller), line 182 and line 170 to M of transformer 193. Relay 146 closes the circuit through line 157, line 171, the coil of relay 143 and line 172 to 170. This closes the motor circuit through lines 112 and 132, so that the motor 103 turns the main valve from function E to function F position where the next stop is made by break of the circuit through lines 180 and 182 by mercoid 181, the roller of which drops into the notch of cam 189 at the F position, again making a stop as previously described.

The main valve will now remain at the F function for some five minutes, or until the contact arm 153 moves around the dial 185 to where contact 178 has been set. Contact between arm 153 and contact 178 completes the circuit from N of transformer 193 through line 156, line 155, wipe contact 154, arm 153, contact 178, line 183, the coil of relay 147, line 163, mercoid 164 (whose roller on cam 188 at the position F holds mercoid 164 closed), line 165 and line 170 to M of transformer 193. Thus relay 147 closes the circuit through line 157, line 171, the coil of relay 143, lines 172 and 170. Relay 143 closes the motor circuit between lines 112 and 132, and motor 103 turns the main valve as previously described. Instead of stopping in the G function or "off" position the motor circuit through lines 112 and 132 remains made since the return to service button 20 is down to hold its three circuits made. However when the G function position is reached the roller of mercoid switch 164 drops into the notch of cam 188 and this would normally stop the motor 103 in the usual manner described above. At cam position G the elongated notch in the cam 187 drops the roller of mercoids 159 and 167 so that these two switches close in advance of the opening of mercoid 164. During the shift to the G function position the circuit that holds relay 147 closed is completed from N of transformer 193 through line 156, line 155, 154, arm 153, contact 178, line 183, the coil of relay 147, line 163, mercoid 164 (now closed), line 165 and line 170 to M of transformer. As the G function position of the cams passes under the mercoid rollers, mercoid 167 is tipped to its closed position by its roller dropping in the elongated notch at the G position of its cam 187, so that it remains closed while the notch at G position of the cam 188 drops the roller of mercoid 164 to open position and to again lift and close the same before mercoid 167 is again lifted to open.

To hold the switch of relay 147 closed, the circuit, during this travel through G position, is from N of transformer 193 through line 156, line 157, switch of relay 147 which has not yet been opened, the pigtail of the switch, line 183, coil of relay 147, line 163, line 166, mercoid 167, line 168, leg 169 of button 20 and line 170 back to M of transformer. This circuit is maintained in spite of the fact that the contact between arm 153 and contact 178 may also be broken. Before th roller of mercoid 167 is tilted out of its notch to open this circuit the roller of mercoid 164 will have lifted out of its notch to close its circuit, which now will be held made until the A position of the cams comes under the rollers and the roller of mercoid 164 drops in the notch of cam 188 at the A position. Thereupon this holding circuit through the coil of relay 147 is broken and relay 147 breaks the circuit through line 171, line 172 and the coil of relay 143. Relay 143 breaks the circuit through line 112 and line 132 to the motor 103 to bring about the stop at function A position. Thus, the full series of functions from B to A through G function position and without stopping therein has been caused to be completed automatically by momentarily depressing the program button 18. The timer contact arm 153 continues on from contact 178 back to its starting point where it also stops because of a breaking of the circuit of motor 129 at one of the mercoids 124 or 125 as previously described. The space between the setting of contact 178 and the zero or starting point on the timer dial 185 provides for additional time in the periods of the several functions in case this is desired.

In case it is desired to carry the program from A automatically through functions B, C, D, E and F but to stop at position G, then the program button 18 is depressed momentarily to start the timer as previously described, following which button 21 is depressed to close its circuit through line 133, leg 134 of the button 21, and line 135. Button 20 on the opposite end of the toggle is snapped up to break the circuit through leg 114 between lines 115 and 116. This action also breaks the circuits through line 160, leg 161 and line 162 and through line 168, leg 169 and line 170. The program of functions will be carried out exactly the same as previously described except that now when the contact arm 153 is approaching the contact 178 and the main valve is in the F function position of this program, as previously described, the making of the contact between arm 153 and contact 178 completes the circuit from N of the transformer 193 through line 156, line 155, wipe contact 154, arm 153, contact 178, line 183, the coil of relay 147, line 163, mercoid 164 (whose cam 188 in the F position holds it closed), line 165 and line 170 back to M of the transformer 193. Closing of relay 147 closes the circuit through lines 112 and 132 from the source 111 to the motor 103. The latter turns the main valve from function F to function G position when the notch of cam 188 in the G position drops the mercoid 164 to open. This breaks the circuit through line 163, line 165 and the coil of relay 147, and the switch of the relay opens to break the circuit through line 157, line 171, the coil of relay 143 and line 172. Upon breaking the last described circuit the switch of relay 143 opens and breaks the circuit through lines 112 and 132 to motor 103, thereby stopping the motor. The holding circuit through line 157, the pigtail of relay 147, line 183, the coil of relay 147, line 163, line 166, mercoid 167 (also closed in the G position), and line 168 to push-button 20 is open since leg 169 of push-button 20 is now raised. Therefore, the valve is not turned through the function G position back to the A position described above in the case of a complete program, but stops at the function G position.

This leaves the filter turned off after having been washed, and the filter is ready to be returned to service when needed. Push-button 21 is now down and push-button 20 on the opposite end of the toggle 191 is up. Button 21 is, therefore, the shut-off button and button 20 is the service button. While in this position the circuit from the source 111 through line 112 and mercoid 113 is open because mercoid switch 113 is open due to its roller being raised on cam 190 in the G position. Hence, the circuit of program button 18 through lines 314 and 115, leg 114, line 116 and line 118 or line 119, cannot be closed to thereby start a program from the G or off position. Also, the circuit through line 114, line 136, the coil of relay 144, line 135, leg 134, line 133, etc., also is dead.

When stopped in the G function or shut-off position the filter may be returned to filtering service; that is, shifted to the A function position, by depressing button 20 which at the same time through the toggle 191 raises button 21. The three bridges across the service button 20 are now closed and motivating circuit from N of transformer 193 is through line 156, line 157, line 158, mercoid 159 (which is closed at the G position of its cam), line 160, leg 161, line 162, line 183, the coil of relay 147, line 163, line 166, mercoid 167 (also closed in the G position, mercoid 164 being open in the G position), line 168, leg 169 of button 20 and line 170 back to M of transformer 193. Relay 147 therefore closes the circuit to the coil of relay 143 which closes the circuit through lines 112 and 132 to the motor 103, to turn the main valve from function G toward function A position. The mercoid 164 is raised by its cam 188 to close before mercoids 159 and 167 open, so that the pigtail circuit through line 157, line 183, the coil of relay 147, mercoid 164, line 165 and line 170 to the transformer holds relay 147 closed until the A position is reached, whereupon the roller of 164 drops into its notch breaking the relay holding circuit and stopping motor 103.

When, after a program has been started, the shut-off button 21 is depressed in order to stop at the G position, the circuit through line 133, leg 134, and line 135 made by the button 21 is not completed because of the interlocking relay 145 which has previously opened the circuit through line 132 and line 133 when the program timer is started. The circuit through line 128, the coil of relay 145 and line 132 being in parallel with the circuit to the timer motor 129, opens the circuit through lines 132 and 133, and holds it open for the duration of the timed programs. This locks out the shut-off button 21 which can be used only when the main valve is in the A function position in order to start motor 103 in reverse direction and so to turn the main valve shaft 85 clockwise, resulting in movement of the main valve backward from A function to G function position. This provides a means for shutting off the filter at any time without passing it through a washing program to reach the off position. When the button 21 is depressed the circuit is made through line 112, mercoid 113 (which is closed in the A position by its cam), line 314, line 136, the coil of reversing relay 144, line 135, leg 134 of push-button 21, line 133, normally closed relay switch 145, and line 132 to the source 111. Push-button 21 snaps down holding this circuit made but when the G function position of the main valve is reached the cam 190 raises mercoid 113 to open it. Energizing the coil of relay 144 closes its four-pole switch but its terminals 138 and 139 leading to the motor 103 are reversed with respect to leads 112 and 132.

Push-button 19 is a function prolong button, being of normally closed type and in the timer motor circuit through lines 130 and 132 it may be depressed to open this circuit and thus stop the timer. It is provided with lugs 192 which when the button is depressed and turned will hold it in the open circuit position until again released. Thus if the filter is in the actual washing process, say in function D, and the timer contact arm 153 is moving away from contact 174 toward contact 177, which contacts are set say 10 minutes apart, and it is desired to prolong this function beyond 10 minutes, then button 19 may be depressed to stop the timer and thereby lengthen the period of this function as much as desired. The normal periods of the several functions may be set or reset to desired length by shifting the contacts 174, 175, 176, 177 and 178 to corresponding positions along the groove 184 around the dial 185. The positions illustrated correspond to the timing used in the foregoing example.

A résumé of the operation of the push-buttons, the operations they control and their interlocking features, is as follows:

As shown in Fig. 18, with filter in its on or A function position and with service button 20 depressed:

(1) If it is desired to wash the filter and return it to the A function, program button 18 is momentarily depressed.

(2) If it is desired to wash the filter and stop the program at the off or G function position, program button 18 is momentarily depressed and then the shut-off button 21 is pressed down.

(3) If it is desired to return the filter to service from the G or shut-off functional position, service button 20 is pressed down.

(4) If it is desired to shut the filter off, that is, change from function A to function G position, shut-off button 21 is pressed down.

(5) If it is desired to prolong any function included in the timed program then while that function is in process prolong button 19 is depressed for the length of time it is desired to add to the normal period of the function in question.

The interlocking features of the control system provide for:

(1) Rendering all control circuits inoperative except those through the program button 18 and the shut-off button 21 while the main valve is in the A function position.

(2) Rendering all control circuits inoperative except the one through the prolong button 19, once the program has been initiated by use of the program button 18. Button 21 may be depressed at any time during the program to cause subsequent stoppage at G position, but the action of button 21 is then to open a circuit that if left closed would later become alive.

(3) Rendering all control circuits inoperative upon depressing the shut-off button 21 to cause shift from function A to function G position, and upon reaching the G function position rendering all circuits inoperative except those through the service button 20.

A mistake by the use of a wrong button does no harm because of its circuit being dead at the time of the mistake. It is also impossible to send a reversing circuit to the main valve motor 103 while it is operating in either direction to move the main valve from one function to another.

As shown in Fig. 18 the start of a program is initiated by the operator, as when the filter is seen to need washing. This initiation may however be controlled automatically to advantage. Thus instead of relying upon the operator the washing program may be started in accordance with a time factor determined by the timing mechanism itself. Or, the program may be started automatically from some condition in the filter, as upon a predetermined loss of head through the filter.

Means for starting a program of functions automatically when a predetermined loss of head through the filter has been reached is shown in Fig. 19, in which the program button 18 which connects line 116 through to line 118 and line 119 as previously explained, may be depressed by a solenoid 200 mounted on the push-button frame 198. A spring 195 between the retainer 197 and the collar 194 on the upper end of the stem 196, all of which are insulated from the switch member 117, holds the core 199 of the solenoid 200 up. When the solenoid 200 is energized, its core 199 is drawn down thus closing the program circuit through line 116, leg 117, line 118 or line 119. The loss of head indicator dial 201 is provided with a slot 203 in which is adjustably mounted the contact 202 so that it may be set for any desired maximum loss of head. The loss of head indicator hand 204 is also a contactor having a hub 205 and wipe contact 206. A normally open single pole relay 208 controls the circuit through line 112 and line 132 from the source 111 to the solenoid 200. The transformer 193, supplied from the source 111 through lines 112 and 132, delivers low voltage energy to the circuit through lines 156 and 170, the latter being connected to contact 206 so that when the loss of head corresponding to the set position of contact 202 is reached the circuit will be completed through line 170, contact 206, hub 205, arm 204, contact 202, line 207, pole 213 of normally closed relay 214, line 215, coil of relay 208, and line 156 to transformer 193. The relay 208 will therefore close the circuit from source 111 through line 112 to line 219, coil of solenoid 200 and line 132 to source 111. Being thus energized, the solenoid 200 will act to close the program initiating circuit 116 through leg 117 of push-button 18 to lines 118 or 119, starting operation as previously described.

The two poles 213 and 220 of the relay 214 remain closed when its coil is energized as shown by the holding circuit from the transformer 193, line 170, line 221, pole 220 of relay 214, coil 222 of relay 214, its resistor 223, line 224 and line 156 to transformer 193. At the end of function C of the program that has thus been initiated, the effluent valve 12, (see Fig. 4) will be closed. The pointer 204 of the loss of head gauge is actuated by suitable means from a float riding on a column of mercury in one leg of a U-tube. One leg of such a tube, shown at 300 in Fig. 4, is connected to the filter effluent line on the downstream side of the effluent valve 12 and the other leg is connected through the wall of the filter basin 10 at a point just below the level 32 therein. Since the effluent line from the filter ordinarily terminates in a water seal in the receiving reservoir, stoppage of flow on the closing of the effluent valve 12 will result in the loss of head gauge tending to indicate the difference in levels between that in the water seal and that in its pipe connection leading from the filter basin below the level 32, although the actual level in the filter basin may be at a lower point at the completion of functions B and C. Because there is always some loss due to flow this difference in levels is a head greater than the loss of head attained during function A, therefore upon closing of the effluent valve 12, the loss of head gauge will indicate this greater head by moving its arm 204 (Fig. 19) to the right where it will meet contact 225. This will complete the circuit from transformer 193, line 170, contact 206, hub 205, arm 204, contact 225, line 226, coil 222 of relay 214, pole 220 of relay 214 and line 221 back to line 170. The coil of relay 214 being thus short-circuited and de-energized, breaks the circuits through line 221, pole 220 and coil 222 of relay 214 and line 207, pole 213 of relay 214 and line 215. The latter circuit upon being thus broken de-energizes the coil of relay 208 which breaks the circuit from the source 111 through lines 112 and 132 to the coil of solenoid 200 thus de-energizing the latter and permitting the spring 195 of the program button 18 to break the circuit from 116 through leg 117 to lines 118 and 119.

When the program is completed and function A is restored then the loss of head through the clean filter bed will be very low. Consequently when the effluent valve is opened the arm 204 will move to the left toward the zero mark on the dial 201. In so doing, it will pass the contact 202 but will be unable to complete the circuit line 170 from transformer 193, contact 206, hub 205, arm 204, contact 202, and line 207 because the pole 213 of relay 214 is open. Thus the immediate initiation of another program is prevented. A contact 227 set at a short distance from the zero mark on the dial 201 will be touched by the arm 204 upon its move to the left to indicate the now low head loss. This will complete the circuit from transformer 193, line 170, contact 206, hub 205, arm 204, contact 227, line 228, coil 222 of relay 214, resistor 233 of relay 214, line 224 and line 156 to transformer 193, thus energizing the coil 222 of relay 214 to close its poles 213 and 220, the latter pole 220 upon closing thus completing the holding circuit from the transformer 193, line 170, line 221, pole 220 of relay 214, coil 222 of relay 214, resistor 223 of relay 214, line 224 and line 156 to transformer 193. The circuit line 207, pole 213 of relay 214 and line 215, being thus closed at the relay 214, is ready to be completed through the coil of relay 208 to initiate the next program when the next contact between the arm 204 and the contact 202 is made.

When the programs of two or more filters are to be initiated automatically, each from predetermined loss of head through its bed, provision must be made to prevent more than one of the filters from being washed at a time, since the flow of wash water needed to wash a filter ordinarily is so great as to preclude washing more than one at a time.

It is not necessary to wait until the end of a program on one filter and its restoration to filtering service before starting a program on a second filter. All that is necessary is to prevent two being in the washing function simultaneously. Consequently the program on a second filter may be initiated at any time that will not cause a washing lap. The time that may be so gained may not be important in a small plant having only a few filter units but it may become very important in a large plant having a considerable number of beds. Means for accomplishing this will now be described.

As shown in Figs. 20 and 21 a synchronous motor 209, energized from the source 111 through the leads 112 and 132 is geared to rotate its shaft 210 in a given time. A friction pinion 216 (see Fig. 21) slidably mounted on the shaft 210 is held in any position along the shaft 210 by the set screw 217. A friction disk 218 on the shaft 211 is rotated by the friction pinion 216 and may, by adjustment of the latter along its shaft 210 be set to make a revolution in the time taken to complete two or more programs of functions or parts thereof as from B to E, depending upon the number of filters in the battery. If the timing of the functions is shortened, then the friction pinion 216 may be adjusted to the left along the shaft 210 to correspond with the shortened period, or vice-versa. Thus for example, with a battery of two filters for which Fig. 20 shows the control, the dial 218 is provided with two contacts 229 and 230, and the continuous rotation of the hand contactor 212 on the shaft 211 provides for completing the circuit through line 156 from the transformer 193 alternately to contacts 229 and 230 every 32 minutes, or in a greater or lesser time, depending upon the adjustments explained previously. Obviously, for three or more filters there would be a corresponding number of contacts on the dial 218 equally spaced and with the time allowance properly adjusted.

In Fig. 20 elements 201 and 231 are the loss of head indicators for filters Nos. 1 and 2 (not shown). Elements 200 and 232 are the solenoids for operating the program push-buttons of two filters. These buttons operate as explained in connection with Fig. 19 to close the program initiating circuit 116, through leg 117 to lines 118 or 119. The showing of these button parts in Fig. 20 is therefore omitted. Assume that the loss of head of filter No. 1 has increased so that the arm 204 of its dial 201 has moved up to the contact 202 in its adjustable position along the groove 203. The contact 202 is elongated so that if arm 204 reaches it just after the arm 212 has passed contact 229, 204 will remain on 202 until 212 again reaches 229 even though there be increase in loss of head during this period. When completed, the circuit from transformer 193 passes through line 156, arm 212 and contact 229 of the selector interlock, line 233, coil of relay 208, line 215, pole 213 of relay 214, line 207, contact 202, arm 204 now in contact with same, hub 205, contact 206, and line 170 to transformer 193. This low voltage circuit therefore energizes the coil of relay 208 which closes its normally open switch thereby completing the high voltage circuit from the source 111 through lines 112 and 219 to coil of solenoid 200 and line 132 to source 111. The solenoid 200 being thus energized closes the program initiating circuit for filter No. 1 as explained in connection with Fig. 19.

The circuit through the coil of relay 208 is soon broken by the arm 212 of the timer moving past the contact 229. Upon the completion of function C of the program for filter No. 1, the effluent valve is closed and as previously explained, the loss of head gauge dial 201 will indicate a higher value thereupon bringing the arm 204 into contact with 225. This will complete the circuit from transformer 193 through line 170, pole 220, coil 222 of relay 214, line 226, contact 225, arm 204, hub 205, contact 206 and back to line 170, thus short-circuiting the coil 222 of relay 214. The coil 222 of relay 214 being thus de-energized opens the poles 213 and 220 of relay 214, thus breaking the circuit from contact 202 through line 207 to line 215 and also the holding circuit of relay 214 from transformer 193, line 170 and pole 220 of relay 214, to the coil 222 of same. When the program of filter No. 1 is completed and function A is restored, the loss of head being now greatly reduced, the arm 204 of the gauge 201 will move to the left toward the zero mark. In so doing, contact will be made between the arm 204 and the contact 202, but the initiating circuit for another program will not be completed even though the arm 212 of the timer should at the same instant be in contact with 229 because the coil 222 of relay 214 being de-energized, the pole 213 of relay 214 is open. Further movement of the arm 204 to the left brings it to contact 227 set just above the zero mark on the dial 201. This completes the circuit from transformer 193, line 170, contact 206, hub 205, arm 204, contact 227, line 228, coil 222 of relay 214, resistor 223, line 234 and line 156 to transformer 193. Relay 214 thus closes its two poles, pole 220 closing the holding circuit from transformer 193, line 170, pole 220 to coil 222, resistor 223, line 234 and line 156 to transformer 193. The other pole 213 closes the circuit line 207 to line 215 so that it may be completed when next the contacts between 204 and 202 and between 212 and 229 of the interlock are both made to initiate the following program for filter No. 1.

The washing program of filter No. 1 will be completed before the timer arm 212 moves from contact 229 to contact 230, but if during this time filter No. 2 builds up a loss of head sufficient to bring the arm 235 of its loss of head gauge 231 in contact with the elongated adjustable contact 236, initiation of the washing program of filter No. 2 will be held in abeyance until the timer arm 212 reaches contact 230. When arm 212 of the selector now reaches contact 230, the circuit is completed from the transformer 193, line 170, contact 238, hub 237, arm 235, contact 236, line 240, pole 244 of relay 243, line 247, coil of relay 250, line 249, contact 230, arm 212 and line 156 to the transformer 193. Relay 250 closes its switch completing the circuit from the source 111 through lines 112 to 251, coil of solenoid 232 and line 132 to source 111. The solenoid 232 therefore closes the program initiating circuit by depressing the program button 18 of filter No. 2 in the manner shown by and described in connection with Fig. 19.

The completion of function C of the program of filter No. 2 brings the effluent valve of that filter to its closed position resulting in an increased movement of the loss of head arm 235 to the right, as previously explained, such that the shorting circuit for the coil 246 of relay 243 is completed from transformer 193 through line 170, contact 238, hub 237, arm 235, contact 252, line 239, coil 246 of relay 243, pole 245 of relay 243, and line 248 back to line 170, thus de-energizing the relay coil 246 and breaking the holding circuit line 248, to coil 246 of relay 243 at pole 245.

Also, circuit line 240 to line 247 is broken at pole 244 of relay 243 so that upon return of the loss of head gauge arm 235 toward the zero mark its contact with 236 in passing same will be unable to complete the last mentioned circuit through relay 243 to initiate another program upon return of filter No. 2 to function A. Upon the arm 235 reaching contact 241 set just above the zero mark, the circuit to re-energize the coil 246 of relay 243 is completed from transformer 193, line 170, contact 238, hub 237, arm 235, contact 241, line 242, coil 246 of relay 243, resistor 253, line 234 and line 156 to transformer 193. The relay 243 thus closes its poles 244 and 245, pole 245 closing the holding circuit from transformer 193, line 170, line 248, pole 245, coil 246, resistor 253, line 234 and line 156 to transformer 193, and pole 244 closing the circuit line 247 to line 240 so that it may be completed to initiate the next program when arm 235 again makes contact with 236 on the loss of head gauge 231, and interlock arm 212 makes contact at 230.

It will be apparent from the preceding that once the contact at the loss of head gauge for a filter is made, that filter will have its program initiated at the beginning of the next period allotted to same by the interlock timer. Also since the time intervals for the two filters are of sufficient length and alternate with each other, or follow each other in rotation where more than two filters are concerned, no two filters will be put into washing phase at the same time. This form of control has the disadvantage where more than two filters are concerned that the rotation of their time intervals may result in undesirable delay in washing a filter, since when it has once been passed by the interlock timer it must wait for a period equal to the sum of the washing periods allowed for all the filters before its turn again arrives, although none of the other filters may need washing. This loss of time is overcome by the form shown in Fig. 22.

Referring now to Fig. 22 the motor 209 is geared to drive the shaft 210 and the selector arm 212 thereon at a relatively rapid rate so that contact will be made with one of the contacts on disk 218 at intervals of a few seconds, there being one of the latter contacts for each filter, three being shown.

The motor 209 receives power from the source 111 through line 112, pole 286 of relay 284, line 285 and back to 111 through line 132. Transformer 193 connected to the source 111 through lines 112 and 132, provides low voltage energy to hold the coil 288 of relay 284 energized through line 170, line 289, pole 287 of relay 284, coil 288, resistor 282, line 283 and line 156 to transformer 193.

Loss of head gauge 201 and starting solenoid 200 are associated with filter No. 1, whose selector dial contact is 257. Another loss of head gauge 231 and starting solenoid 232 are associated with filter No. 2, whose selector dial contact is 258. And another loss of head gauge 270 and starting solenoid 254 are associated with filter No. 3, whose selector dial contact is 259.

Assuming now that filter No. 3 has built up a loss of head that moves the arm 263 on its loss of head gauge dial 270 over to the elongated and adjustable contact 264, following which the selector arm 212 reaches the selector dial contact 259.

This will complete the circuit from transformer 193 through line 170, contact 260, hub 261, arm 263, contact 264, line 265, pole 273 of relay 271, line 279, selector contact 259, arm 212, line 281, coil 288 of relay 284, pole 287 of relay 284, and line 289 back to line 170, thus short-circuiting the coil 288 of relay 284. The poles of relay 284 therefore will open, thus breaking the shorting circuit through the pole 287 from the coil 288 of relay 284, and also the circuit 112 from the source 111 to line 285 and the motor 209 at the pole 286 of relay 284. The motor 209 therefore will stop when selector arm 212 makes contact with 259, with arm 263 of the loss of head gauge 270 in contact with 264.

It will be noted also that when the above-mentioned circuit is completed from transformer 193 through line 170, contact 260, hub 261, arm 263, contact 264, line 265, pole 273 of relay 271, line 279, contact 259 to arm 212, and thence to line 281, a circuit is also made through arm 212 to contact 303 on dial 218 to line 280, coil of relay 255, line 256, line 234 and line 156 to transformer 193. Relay 255 closes its switch, completing the circuit from source 111 through line 112, switch of relay 255, line 306, coil of solenoid 254 and line 132 to source 111. Thus energized, the solenoid 254 acts to operate the program button 18 of filter No. 3 in the manner shown and described in connection with Fig. 19.

Referring in Fig. 22 to the relay 271, it will be noted that the circuit holding its coil energized to keep its poles closed is from transformer 193, line 170, pole 274 of relay 271, coil 272, resistor 308, line 234 and line 156 to transformer 193.

The washing program of filter No. 3 having been initiated as explained above, is now carried out while the motor 209 remains stopped with selector arm 212 remaining in contact with contacts 259 and 303. At the end of function C in the program of filter No. 3 the closing of its effluent valve 12 (see Fig. 4) will result in the arm 263 of its loss of head gauge 270 moving to the right for the reasons previously explained. Arm 263 will thereupon contact with 266 completing the circuit from transformer 193, line 170, contact 260, hub 261, arm 263, contact 266, line 267, coil 272 of relay 271, pole 274 of relay 271 and back to line 170, thus short-circuiting the coil 272 of relay 271, which thereupon opens its two poles 273 and 274 breaking the circuits leading from these two poles to line 170 and to line 279 respectively. Breaking the circuit through 279 interrupts the circuit through the latter to the selector contact 259, arm 212 to line 281; also the circuit through arm 212 to contact 303 and line 280 to the coil of relay 255 thus de-energizing the latter to open its switch in the line 112 to line 306 to de-energize the coil of solenoid 254. Thus the program button 18 of filter No. 3 is released.

In the further course of its program the main control valve for filter No. 3 will move to function E to terminate the actual washing operation. In so doing, a rotary switch 296 (Fig. 22) whose arm 292 is attached to its shaft 104 (see Figs. 15, 16 and 17) will make contact between arm 292 and adjustable set contact 299. This will momentarily complete the "on" circuit of relay 284 from transformer 193, line 170, line 293, arm 292, to contact 299, line 300, coil 288 of relay 284, resistor 282, line 283 and line 156 to transformer 193. Relay 284 will thereupon close its poles, pole 287 closing the holding circuit from transformer 193, line 170, line 289, pole 287, coil 288, resistor 282, line 283 and line 156 to transformer 193, and pole 286 will close the circuit from the source 111, line 112, pole 286, line 285, motor 209 and line 132 to source 111, thereupon starting the motor 209 which now resumes driving the selector as before.

Filter No. 3 will have its program terminated in due course by return to function A whereupon as previously explained in connection with Fig. 19, the loss of head gauge will move its arm 263 toward its zero position. In so doing it will pass contact 264, but this will not complete the circuit therethrough because the poles of relay 271 are at this time open and thus the premature initiation of another program cannot take place even though the contact between 263 and 264 should take place at the exact moment the selector arm 212 passes contacts 259 and 303.

In moving toward the zero mark of the gauge 270 the arm 263 after passing the contact 264 will shortly reach contact 268 set to the right of the zero mark a short distance. This will complete the "on" circuit of relay 271 from transformer 193, line 170, contact 260, hub 261, arm 263, contact 268, line 269, coil 272 of relay 271, resistor 308, line 234 and line 156 to transformer 193. Relay 271 thereupon will close, pole 274 will complete the holding circuit from transformer 193, line 170, pole 274, coil 272, resistor 308, line 234 and line 156 to transformer 193. Pole 273 will close the gap between line 265 and line 279 but the circuit in which these are comprised will not again be completed to initiate a washing program for filter No. 3 until its loss of head gauge arm 263 again reaches contact 264 and also the selector arm 212 reaches contacts 259 and 303.

If, during the washing program of filter No. 3 the loss of head of say filter No. 2 has built up so that the arm 235 of its loss of head gauge 231 has moved up to the contact 236, the washing program of filter No. 2 will be held in abeyance and it will remain in filtering service because at the time the selector motor 209 will not be running and the circuit from transformer 193, line 170, contact 238, hub 237, arm 235, contact 236, line 240, pole 244 of relay 243, line 277, selector contact 258 to arm 212 of selector cannot be completed.

When the washing function E of filter No. 3 is completed and the motor 209 again started as above referred to, selector arm 212 moves clockwise away from contacts 259 and 303 and soon reaches contacts 257 and 301 associated with filter No. 1. The circuits from arm 212 to contacts 257 and 301 can not now be completed because the loss of head of filter No. 1 is not sufficient at the time to bring the arm 204 of dial 201 associated with filter No. 1 into contact with 202. The motor 209 therefore continues to run and in a few seconds selector arm 212 reaches contacts 258 and 302 associated with filter No. 2, whereupon the completion of the "off" circuit to relay 284 will stop the motor 209 and the completion of the circuit through the coil of relay 250 will result in energizing the solenoid 232 and the operation of program button 18 associated with filter No. 2.

It will be understood from Fig. 22 that the rotary switches 294, 295 and 296 are associated respectively with filters Nos. 1, 2 and 3, and that the program initiating circuit for any one of the filters that is closed at its loss of head gauge is completed only when the selector arm 212 reaches the selector contact associated with that filter and that simultaneously with the completion of any filter program initiating circuit the selector motor stops and remains stopped until the actual washing operation of that filter (function E) is finished. Thereupon the rotary switch associated with that filter causes the closing of the circuit through relay 284 so that the selector resumes running, to be stopped again when its arm 212 reaches the selector contacts associated with the next filter to reach a predetermined loss of head. It is apparent that in this form there may be any number of filters associated under control and that each will be put into its washing program when needed as determined by the loss of head through it, subject only to the few seconds delay in the action of the selector, plus from time to time the delay due to washing a prior filter. This latter delay is of course no more than would occur with a manually operated plant where two filters can not be washed at once.

It will be apparent that various combinations of arrangement of the above described parts may be made and the forms thereof changed; also that the circuits may be differently arranged, all without departing from my invention.

I claim:

1. The combination with a filter of an operation control including a plurality of valves, a motor operatively joined to said valves, and a variable period timer therefor, said control being adapted to control said motor for operating said filter through a series of functions in sequence by movement of said valves, said timer including a plurality of members adjustable to fix the period for each of said functions, and means for starting said timer to energize the motor to operate said valves to initiate the said series of functions.

2. The combination with a filter of an automatic operation control and a timer therefor, said control including means for operating said filter to terminate an untimed service function, for carrying it through a series of timed functions in sequence, for stopping it in an untimed shut-off function, for carrying it by said shut-off function and restoring it to said service function, said timer being associated with said control and operative to fix the period of each of said timed functions, means for starting said timer to initiate operation through the said series of functions, and associated means whereby the control may be selectively biased to stop in the shut-off position or passed by the same to restore said service function.

3. The combination with a filter of an automatic function control, said control including means operating said filter to terminate an untimed service function, to carry it through a sequential series of functions adaptable to timing, and to carry it through an untimed shut-off function adjacent to the first said service function, means for starting said control in a reverse direction to terminate the first service function, means associated with said control for stopping the same at the said adjacent shut-off function, means for starting said control in a forward direction to terminate said shut-off function, and means associated with said control for stopping of the same upon restoration of said service function.

4. The combination with a filter of an automatic function control and a timer therefor, said control including means operating said filter to terminate an untimed service function, to carry it through a series of timed functions and through a shut-off position back to the first service function, the said timer coacting with said control to fix the period for each of the timed functions, a first means for starting the timer to initiate the series of functions, a second means for starting the control to move in a reverse direction to terminate the service function and to stop in the shut-off function, and means associated with the first and second starting means whereby either is rendered inoperative for a period upon use of the other.

5. A filtration system comprising a plurality of filter units each of which has conduits for flow of water thereto and therefrom and power-operated valves on said conduits for controlling flow therethrough; each of said units having associated therewith a control system including a motor and a pilot member actuable thereby for controlling the application of power to said valves to cause them to open and to close according to a predetermined schedule to effect separation of the unit from filtration service, passage through a cleansing program and restoration to filtration service, said system comprising a timing member in said control system for controlling said motor and normally inoperative during the filtration period and normally in continuous operation during the cleansing program, said timing member when in operation being adapted to close circuits at predetermined intervals to start the motor to actuate the pilot member that controls application of power to said valves to operate same, said pilot member having associated therewith switches effective to cause said motor to stop upon the pilot member reaching predetermined positions, a source of electric energy, an initiating switch and electric circuits joining the several elements of said control system so that upon closing the initiating switch the timing means will normally be put in operation to control the starting of said motor to actuate said pilot member to control said valves to effect said cleansing program, and an interlock system uniting the several said unit control systems and effective to prevent the starting of a timing means on a second unit prior to the elapsing of a predetermined period after the timing means has been started on a first unit.

6. In combination, a filter having conduits for flow of liquid thereto and therefrom, power-operated valves on said conduits, a pilot member adapted to control application of power to actuate said valves toward open or closed position singly or in groups according to the position of said member, a motor joined to said pilot member to move same, switch members so associated with said pilot member as to be opened or closed according to the positioning of said member, said switches being comprised in circuits controlling said motor to cause it to stop and to permit it to be started; a second motor, a contact arm moved by said second motor, contacts in the path of said motor, a source of energy, circuits operatively joining said source, said arm, said contacts and said first named motor so that the latter will be started upon contact being made between said arm and one of said contacts, an initiating switch and circuits operatively joining said initiating switch and said second motor and said source to start and continuously operate said second motor during the cleansing program and to stop said second motor when said arm assumes a predetermined position.

7. The apparatus of claim 6 comprising additional means whereby said initiating switch may be caused to close from a remote point.

8. The apparatus of claim 6 comprising additional means remotely located whereby one of the last named circuits may be periodically interrupted.

9. A time control mechanism for controlling an operating circuit comprising in combination a timing member having a movable arm, a motor so joined to said arm as to move it through a predetermined path, contacts in the path of said arm, a source of energy, an initiating switch, circuits joining said motor, said arm, said contacts, said source and said switch so that upon closing said switch said motor will be energized to move said arm across said contacts, and so that when said arm touches one of said contacts said operating circuit will become energized; and means effective when said arm has traveled throughout said path to break one circuit that includes said motor and to prepare another circuit that includes said motor.

10. A controlling device combined with means adapted to start and stop said device at the beginning and end of a fixed period of time, said device comprising a motor and an indicator arm geared to said motor in a manner to make one rotation in the said period; said means comprising a pair of movable members joined to said motor in a manner to make one-half of a complete motion in the said period, a pair of switches adapted to be opened and closed the first by one of the said members, the second by the other of said members, a pair of relays, the coils of which are energized one by a circuit through the first of the said switches, the other by a circuit through the second of said switches, the said relays controlling the circuit to the said motor, a starting switch adapted to complete a circuit through either of the said switches, the said members being so placed and so shaped that upon either reaching a predetermined position it will open its associated switch to stop the said motor and the other one thereof will at about the same time close its associated switch to prepare the next starting circuit through the starting switch, the two said starting circuits being used alternately.

11. In a gravity operated filter having a filter bed, an influent valve, an effluent valve, a waste valve, a wash valve and a rewash valve, operating mechanism for manipulating said valves to produce a series of operating functions, time actuated means for controlling said operating mechanism, and means operable upon a predetermined loss of head in said filter bed for initiating the action of said time actuated means.

12. In a gravity operated filter system having a plurality of filter beds each bed controlled by an influent valve, an effluent valve, a waste valve, a wash valve and a rewash valve, operating mechanisms in connection with the valves of each of said filter beds for manipulating said valves to produce a series of operating functions, time actuated means in connection with each of said operating mechanisms for controlling the action of said operating mechanisms, means for initiating the action of each of said time actuated means, and a selector for determining the order of initiating the action of said time actuated means.

13. In a gravity operated filter system having a plurality of filter beds each bed controlled by an influent valve, an effluent valve, a waste valve, a wash valve and a rewash valve, operating mechanisms in connection with the valves of each of said filter beds for manipulating said valves to produce a series of operating functions, time actuated means in connection with each of said operating mechanisms for controlling the action of said operating mechanisms, means operable upon a predetermined loss of head for initiating the action of each of said time actuated means, and a selector for determining the order of initiating the action of said time actuated means.

14. A filtering system including a plurality of units each composed of the combination of a filter member having conduits for supply of liquid thereto and for delivery of liquid therefrom, power-operated valves on said conduits for controlling the flow of liquid therethrough, a pilot member for controlling application of power to said valves to actuate the same, a timing member adapted to control application of power to move said pilot member through a series of stops the intervals between which are determined by said timing member, means rendered operative as said pilot member reaches a series of predetermined positions to cause it to stop in said positions, and means for initiating operation of said timing member; and additional means for correlating the operation of said units so that operation of a timing member on one of said units cannot be initiated while the timing member on another of said units is in operation prior to having reached a predetermined period in its operation.

15. The combination with a filter having conduits for flow of water thereto and therefrom and power-operated valves on said conduits for controlling flows therethrough, of means for controlling the opening and closing of said valves in a predetermined timed sequence according to a series of steps of the operating cycle of said filter, said means comprising a timing member that has a contact member adapted to be turned through a predetermined path, an initiating switch, a motor for driving said contact member adapted to be started by said initiating switch and to be stopped when said contact member has been turned throughout said path, a series of contacts in said path adapted to be engaged by said contact member, a pilot member for controlling application of power to said valves, a motor for moving said pilot member adapted to be started when said contact member engages any of said contacts, a plurality of switches adapted to be opened or closed according to the position of said pilot member and when opened adapted to stop said pilot member motor, a source of electric power, and electric circuits joining said source, motors, contacts, contact member and switches.

16. A filtering system comprising a plurality of units, each including a filter member having conduits for supply of liquid thereto and for delivering liquid therefrom, power-operated valves on said conduits for controlling flow of liquid therethrough, a pilot member for controlling application of power to said valves to actuate same, a timing member adapted to control application of power to move said pilot member through a series of steps the intervals between which are determined by said timing member, means rendered operative as said pilot member reaches a series of predetermined positions to cause it to stop in said positions, and means to control said timing member so as to selectively start and stop it in its several positions, said filtering system also comprising an additional member adapted to correlate the operation of said units in a manner so that operation of a timing member on a second unit cannot be initiated while the timing member of a first unit is in operation prior to the last mentioned timing member having reached a predetermined period in its operation.

WALTER J. HUGHES.